United States Patent
Jiang

(10) Patent No.: US 12,048,369 B1
(45) Date of Patent: Jul. 30, 2024

(54) MULTIFUNCTIONAL ELECTRIC BRUSH HEAD

(71) Applicant: Wenjuan Jiang, Dazhou (CN)

(72) Inventor: Wenjuan Jiang, Dazhou (CN)

(*) Notice: Subject to any disclaimer, the term of this patent is extended or adjusted under 35 U.S.C. 154(b) by 0 days.

(21) Appl. No.: 18/459,284

(22) Filed: Aug. 31, 2023

(51) Int. Cl.
| | |
|---|---|
| *A46B 5/00* | (2006.01) |
| *A46B 13/02* | (2006.01) |
| *A46B 15/00* | (2006.01) |
| *A61C 17/22* | (2006.01) |

(52) U.S. Cl.
CPC ............ *A46B 5/0083* (2013.01); *A46B 5/005* (2013.01); *A46B 5/0095* (2013.01); *A46B 13/02* (2013.01); *A46B 15/0004* (2013.01); *A46B 15/0036* (2013.01); *A61C 17/224* (2013.01); *A61C 17/225* (2013.01); *A46B 2200/3033* (2013.01)

(58) Field of Classification Search
CPC ... A61C 17/224; A61C 17/225; A46B 5/0095; A46B 15/0036; A46B 13/02
See application file for complete search history.

(56) References Cited

U.S. PATENT DOCUMENTS

| | | | |
|---|---|---|---|
| 10,244,907 B2 | 4/2019 | Jang | |
| 2004/0237228 A1* | 12/2004 | King | A47L 11/4038 15/29 |
| 2021/0106192 A1 | 4/2021 | Chen | |
| 2021/0307887 A1* | 10/2021 | Trentel | A61C 17/227 |
| 2023/0190432 A1* | 6/2023 | Bloch | A46B 5/00 15/21.1 |

FOREIGN PATENT DOCUMENTS

| | | | | |
|---|---|---|---|---|
| CN | 108056837 A | * | 5/2018 | ............ G09F 25/00 |
| DE | 202022105566 U1 | * | 10/2022 | ............ A46B 13/02 |

\* cited by examiner

*Primary Examiner* — Laura C Guidotti
(74) *Attorney, Agent, or Firm* — Jeenam Park

(57) ABSTRACT

An embodiment of the present disclosure discloses a multifunctional electric brush head including a control component, an execution component, a fix component, and a work brush head; a relative rotation of the control component and the execution component, and a self-rotation of the execution component; thus, a wide clean range can be achieved. Different work brush heads can be replaced as needed to achieve a good clean result and work brush heads belonging to different fields can be also replaced to adapt to a wide work scope. The electric brush head can be handheld to clean a dead angle, and it may be provided with a telescopic rod. It is further provided with a light to illuminate a place to be cleaned. And the execution component and the telescopic rod are designed to cooperate with each other to achieve a fix and electrically connected effect.

9 Claims, 19 Drawing Sheets

MULTIFUNCTIONAL ELECTRIC BRUSH HEAD

TECHNICAL FIELD

The present disclosure relates to the field of electric cleaning tools, and in particular to, a multifunctional electric brush head.

BACKGROUND

With the development of society, people's living standards are getting higher and higher, and electric cleaning tools are becoming more and more widely used in industries, service industries, households, and other places, such as using electric cleaning brushes to clean the ground. However, for some electric cleaning brushes, it can be found that the brush heads of existing cleaning brushes do not have adjustment functions, have dead angles when cleaning, and have single function, limited usage range, poor effectiveness, and insufficient flexibility.

SUMMARY

In order to overcome the above shortcomings, the present disclosure provides a multifunctional electric brush head, aiming to improve the problems in the existing technology.

An embodiment of the present disclosure provides a multifunctional electric brush head, which includes a control component, an execution component, a fix component, and a work brush head; the control component is rotatably connected to the execution component through the fix component; the control component is electrically connected to the execution component; the execution component is capably of rotating itself, the execution component is connected to the work brush head;

the control component includes: a fix hole, configured to connect the control component, a light switch key, an electric brush switch key, a solar panel, a waterproof silicone block, a touch display screen, a top charge port, a sound hole, a wiring hole, a charge port inside the silicone block, a voice control module, and a power supply; the light switch key, electric brush switch key, solar panel, touch display screen, top charge port, charge port inside the silicone block, voice control module, and power supply are all electrically connected.

In an embodiment of the present disclosure, the fix component is elastic, the fix component includes a hook, a notch, a rectangular protrusion, and a circular protrusion; the hook is on a bottom surface of the fix component; and the notch, rectangular protrusion, and circular protrusion are on a side surface of the fix component.

In an embodiment of the present disclosure, the execution component includes a fix hole connecting the execution component, an electric motor, a fix connection element, a lower cover of the execution component, a body of the execution component, an upper cover of the execution component, and a self-rotation limit mechanism; the fix hole of the execution component is located on the upper cover of the execution component; the upper cover of the execution component is fixed on the body of the execution component; the lower cover of the execution component is fixed below the body of the execution component; the electric motor is inside the body of the execution component and fixed above the lower cover of the execution component; an output shaft of the electric motor is connected to the fix connection element.

In an embodiment of the present disclosure, the fix connection element includes a bayonet and a positioning bulge; the work brush head includes a clamp block, a cavity, and a concave edge; the clamp block is clamp-connection with the bayonet, the cavity accommodates the fix connection element, and the concave edge corresponds to the positioning bulge; the work brush head is connected to the fix connection element.

In an embodiment of the present disclosure, the body of the execution component includes a light, a rotation prompt portion, a self-rotation latch, a self-rotation block, and a self-rotation slide groove; the self-rotation limit mechanism is matched with the self-rotation latch; the upper cover of the execution component is matched with the self-rotation block and fit with the self-rotation slide groove.

In an embodiment of the present disclosure, the self-rotation limit mechanism includes a self-rotation limit button, a fix bracket of the self-rotation limit mechanism, a spring, and a self-rotation limit clamp block; the fix component includes a hole on the same side with the self-rotation limit button; the self-rotation limit mechanism is fixed inside the upper cover of the execution component.

In an embodiment of the present disclosure, the upper cover of the execution component includes a self-rotation fix block, a self-rotation slide rail, a fix threaded hole of the fix bracket, and an accommodating slot of the self-rotation limit clamp block.

In an embodiment of the present disclosure, the fix bracket of the self-rotation limit mechanism is fixed on the fix threaded hole of the fix bracket; the self-rotation limit clamp block is placed by the fix bracket of the self-rotation limit mechanism and the accommodation slot of the self-rotation limit clamp block together; the spring is located between the self-rotation limit clamp block and the fix bracket of the self-rotation limit mechanism; the self-rotation slide rail is located inside the self-rotation slide groove, the self-rotation fix block and the self-rotation block are located on the same horizontal plane, and the self-rotation limit clamp block is engaged with the self-rotation latch.

In an embodiment of the present disclosure, the fix connection element includes at least one first magnet, and a corresponding position of the work brush head includes at least one second magnet; the first magnet is attracted to the second magnet.

In an embodiment of the present disclosure, the electric brush head includes a telescopic rod; the telescopic rod includes a threaded plug and a button; the threaded plug is electrically connected to the button; and the telescopic rod is electrically connected to the control component.

In an embodiment of the present disclosure, the electric brush head includes a charge base; the charge base is provided with a charge port and a groove.

Compared with the prior art, the beneficial effect of the present disclosure is that, different from the prior art, the present disclosure provides a multifunctional electric brush head, which includes a control component, an execution component, a fix component, and a work brush head; a relative rotation between the control component and the execution component, and a self-rotation of the execution component; and thus, a large clean range is achieved. A user may replace different work brush heads as needed to achieve a better clean result, and even apply them to different fields, such as adding a weeding work brush head for weeding, adding a fan blade work brush head for producing wind to cool, etc., and the electric brush head can be held in hand for cleaning work, such as, cleaning a dead angle, and may be provided with a telescopic rod to cope with a general scenario. It can be further provided with a light to illuminate a place to be cleaned. At the same time, the execution component and the telescopic rod are designed to cooperate with each other to achieve a fix and electrically connected effect, allowing the telescopic rod to also control an operation of the electric brush head.

BRIEF DESCRIPTION OF DRAWINGS

In order to provide a clearer explanation of the technical solution of the present disclosure, a brief introduction will be given to the drawings required for the embodiment. It should be understood that the following drawings only illustrate a certain embodiment of the present disclosure, and therefore should not be regarded as limiting the scope. For ordinary technical personnel in the art, other relevant drawings can also be obtained based on these drawings without creative work.

DETAILED DESCRIPTION

The following will describe the technical solution in the embodiment of the present disclosure in combination with the drawings.

Figure 1:
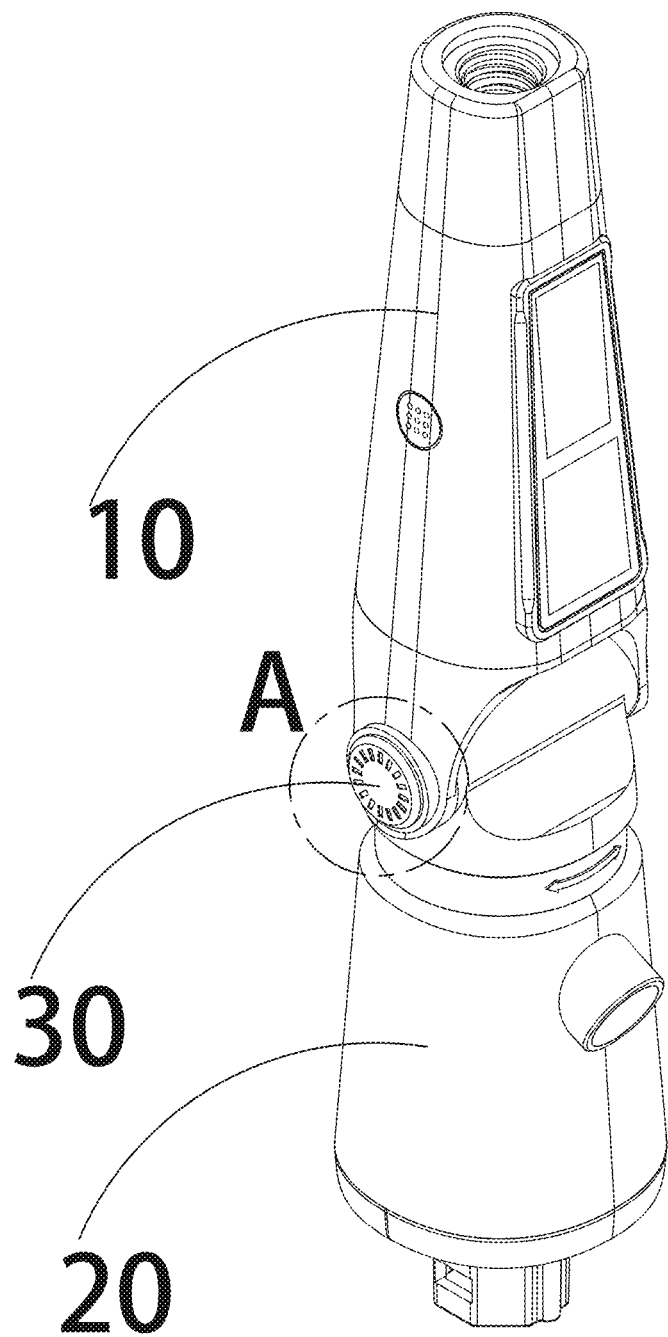
FIG. 1 is an inner structural schematic diagram of a multifunctional electric brush head provided in an embodiment of the present disclosure.
Figure 2:
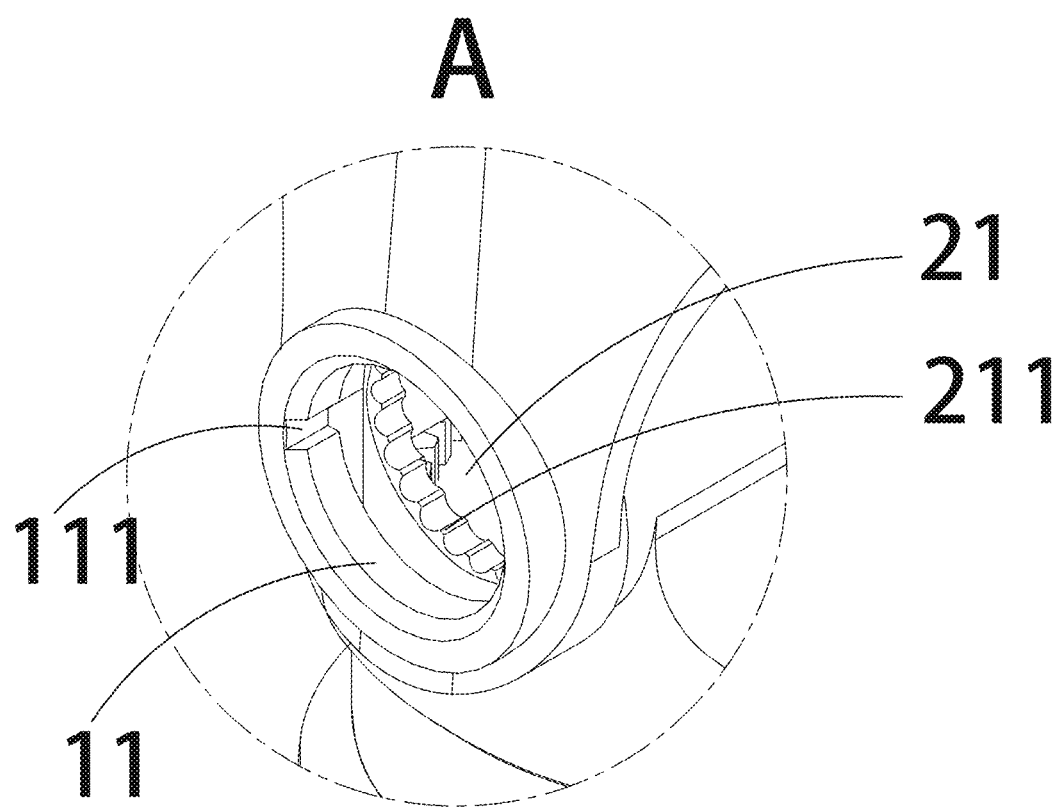
FIG. 2 is a schematic diagram of an enlarged internal structure at position A in FIG. 1.
Figure 3:
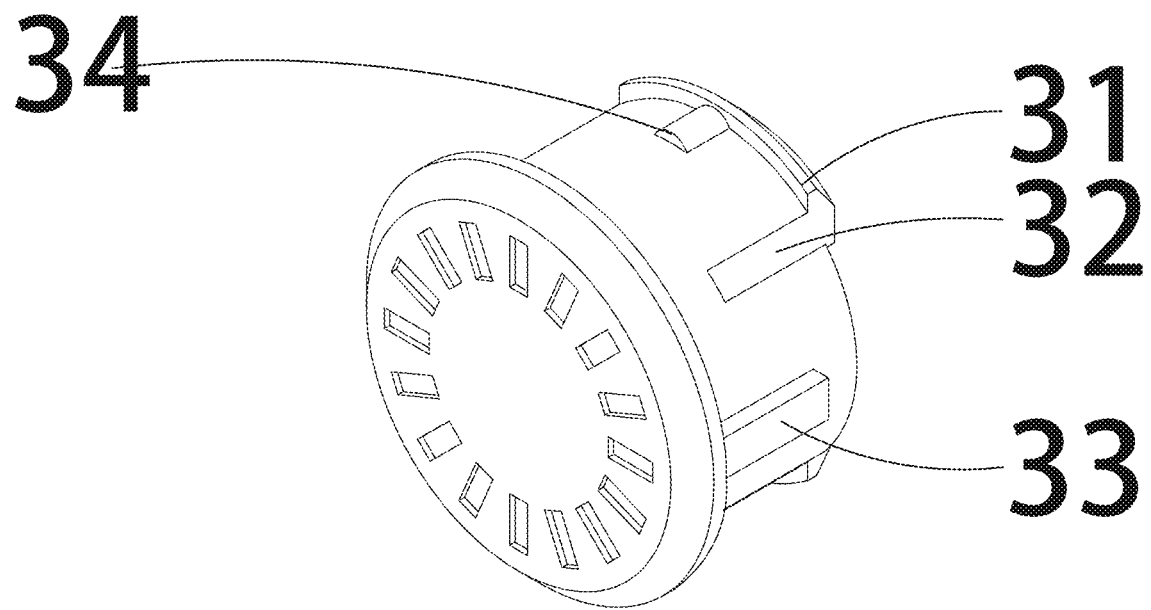
FIG. 3 is a structural schematic diagram of a fix component provided in an embodiment of the present disclosure.

Please refer to FIGS. 1 to 3. The electric brush head includes a control component 10, an execution component 20, and a fix component 30; the control component 10 is rotatably connected to the execution component 20 through the fix component 30, so that the control component 10 and the execution component 20 can rotate and adjust an angle relative to each other.

A bottom of the control component 10 includes a fix hole 11 for connecting the control component, a top of the execution component includes a fix hole 21 for connecting the execution component 20, the fix hole 11 includes a groove 111, and the fix hole of the execution component 21 includes a latch 211. The fix component 30 is elastic, and includes a hook 31, a notch 32, a rectangular protrusion 33, and a circular protrusion 34; the hook 31 is on a bottom surface of the fix component 30; and the notch 32, rectangular protrusion 33, and circular protrusion 34 are on a side surface of the fix component 30. When the fix hole 11 coincides with the fix hole 21, due to the fix component 30 being elastic, the fix component 30 can pass through the fix hole 11 and fix hole 21. And the rectangular protrusion 33 clamps into the groove 111, the circular protrusion 34 clamps into the latch 211, the hook 31 extends into an interior of the fix hole 21, and the control component 10 is connected to the execution component 20, allowing for a relative rotation of the control component and the execution component.

Figure 4:
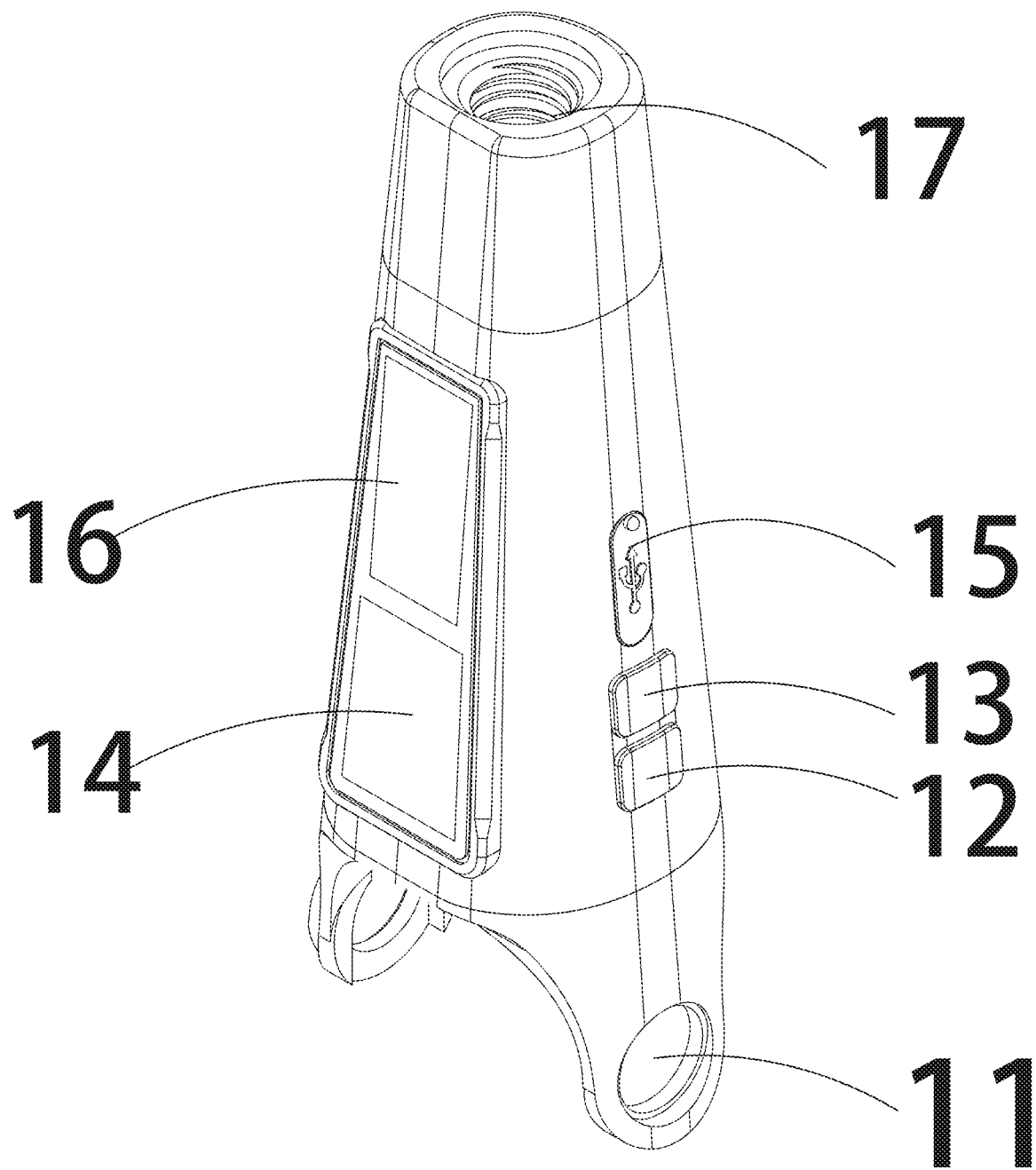
FIG. 4 is a first structural schematic diagram of a control component provided in an embodiment of the present disclosure.
Figure 5:
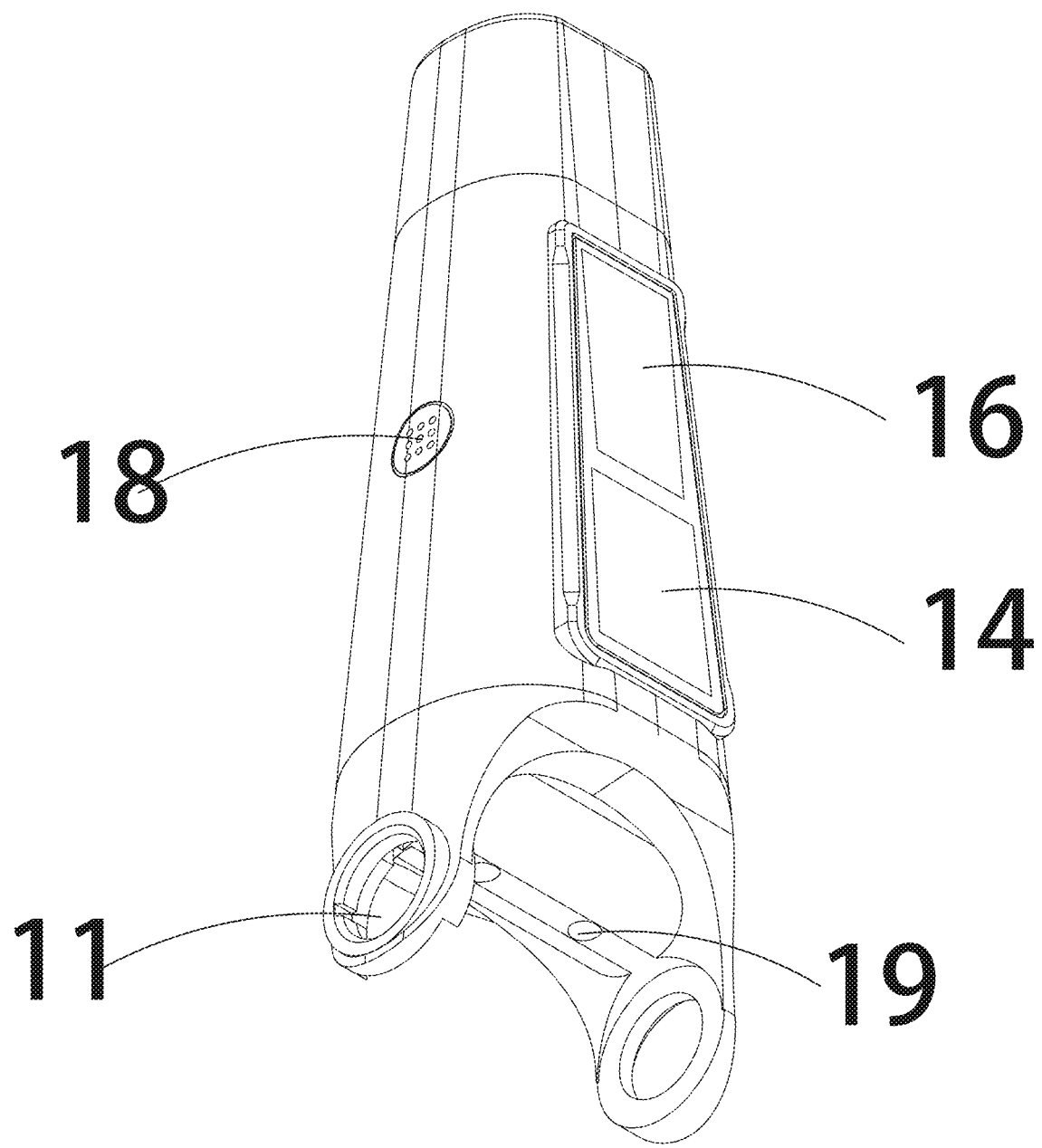
FIG. 5 is a second structural schematic diagram of the control component provided in the embodiment of the present disclosure.
Figure 6:
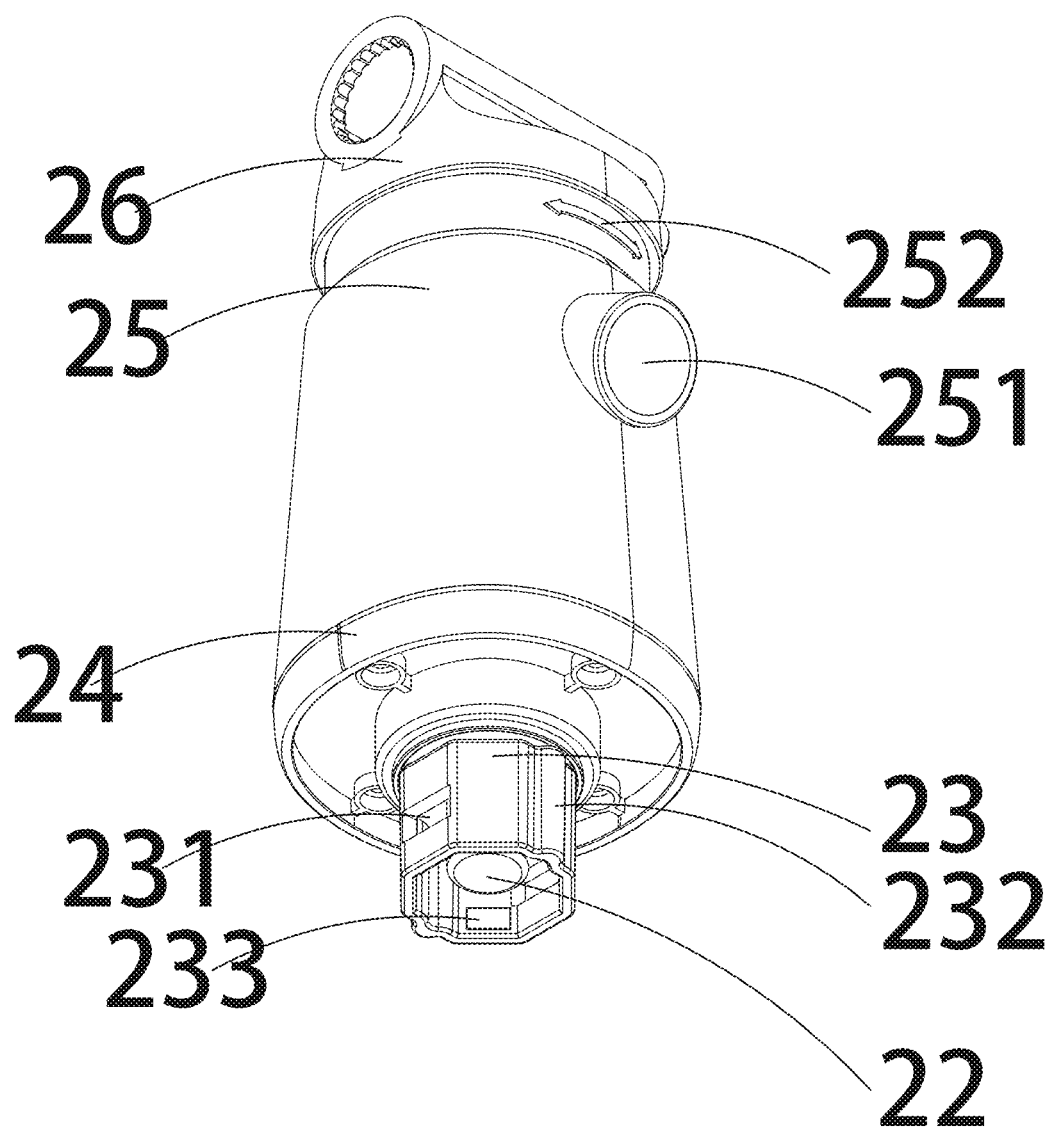
FIG. 6 is a first structural schematic diagram of an execution component provided in an embodiment of the present disclosure.
Figure 7:
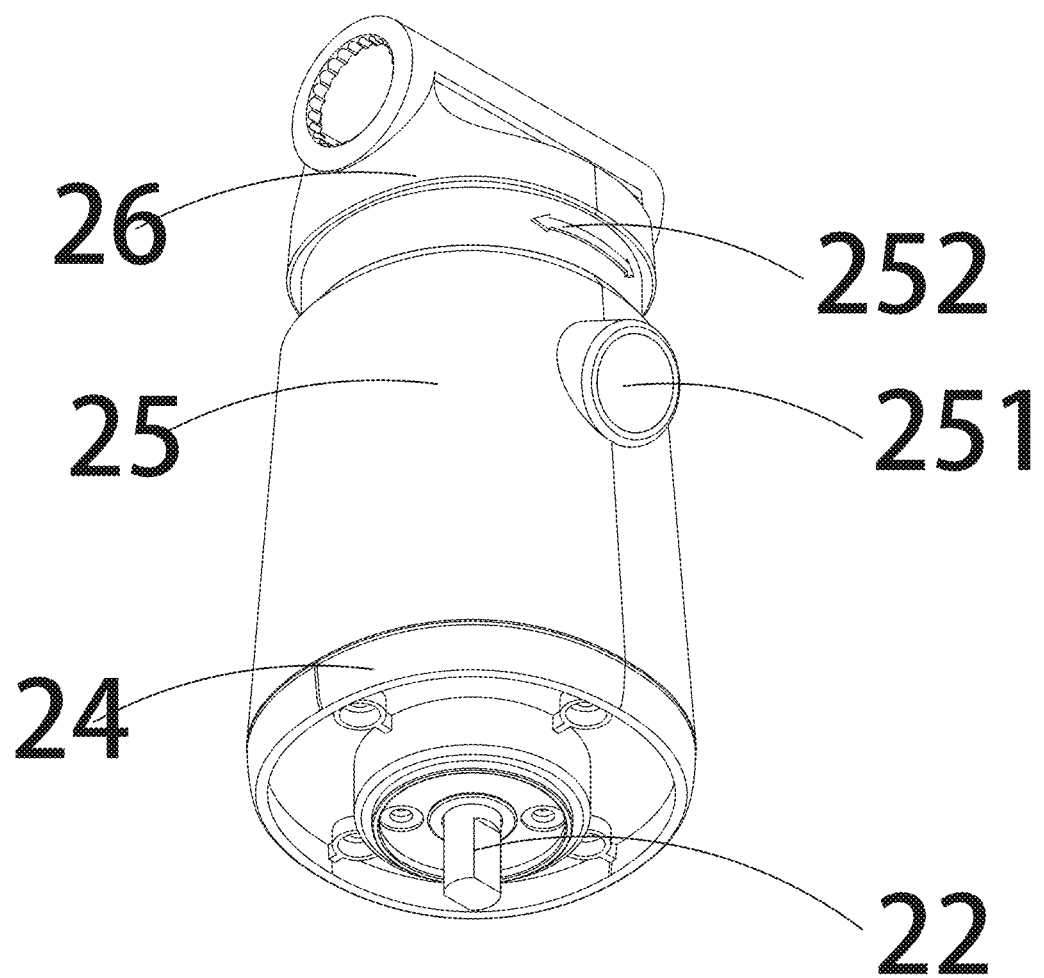
FIG. 7 is a second structural schematic diagram of the execution component provided in the embodiment of the present disclosure.
Figure 8:
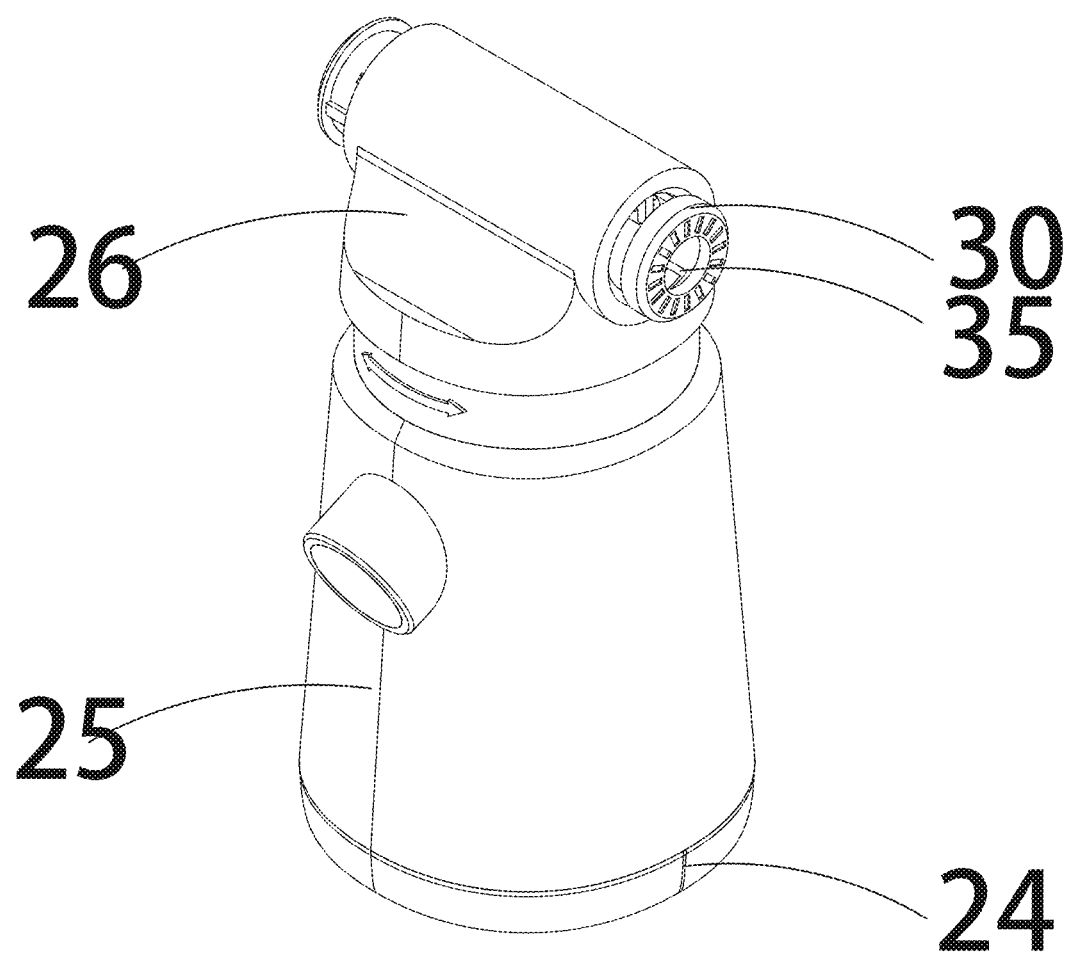
FIG. 8 is a schematic diagram of a fix connection element being with the same side of the self-rotation limit mechanism provided in an embodiment of the present disclosure.
Figure 9:
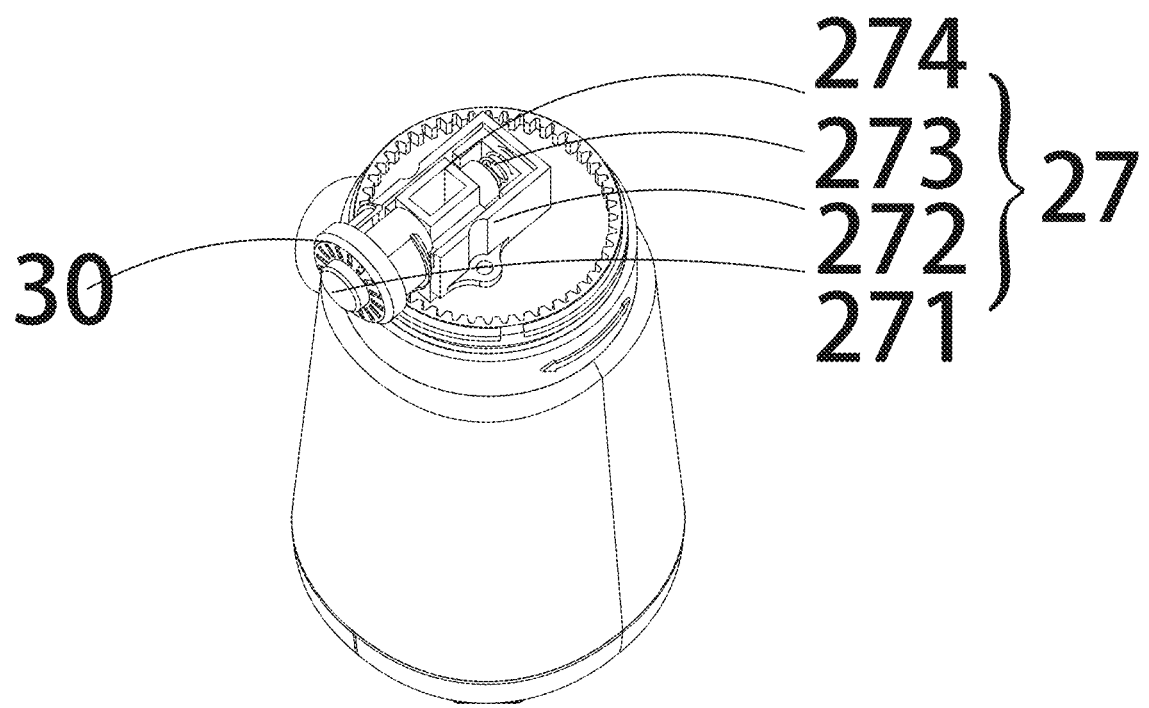
FIG. 9 is a structural schematic diagram of a self-rotation limit mechanism provided in an embodiment of the present disclosure.
Figure 10:
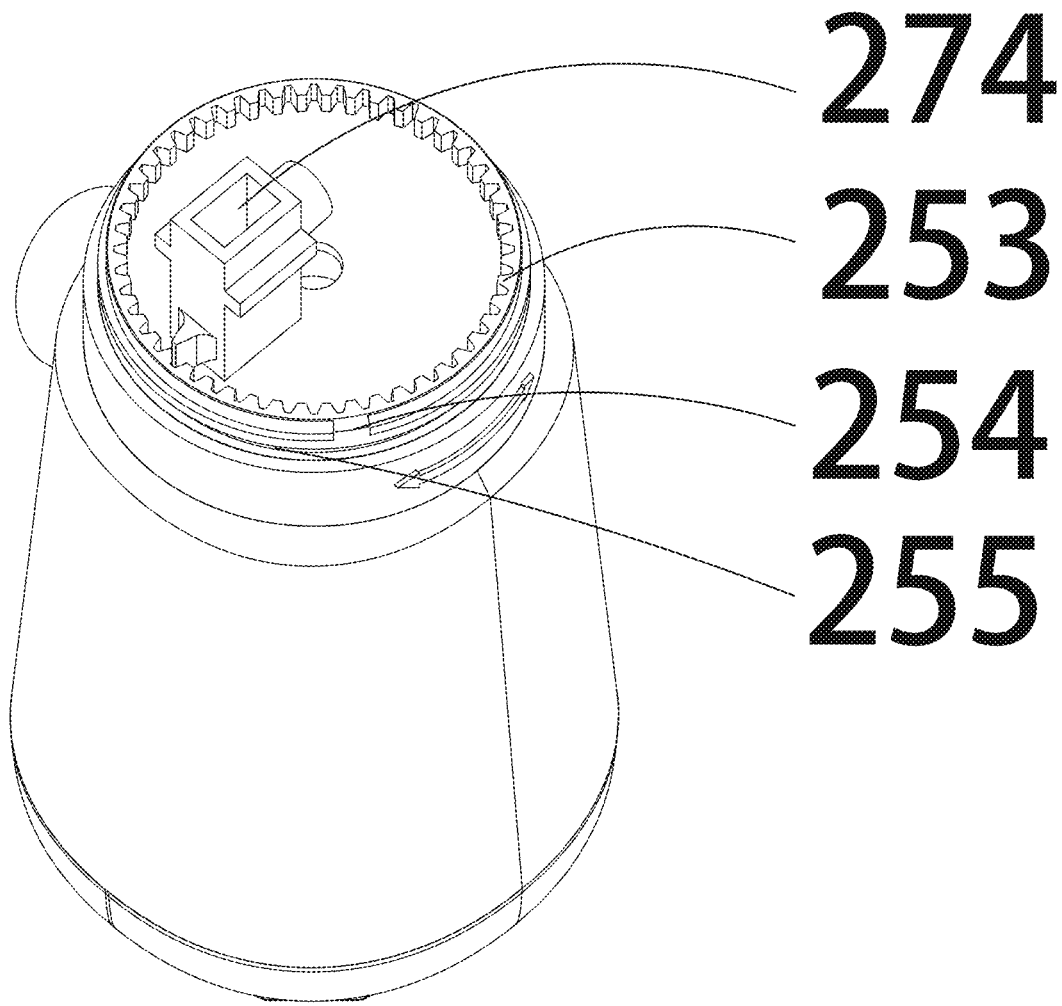
FIG. 10 is a structural schematic diagram of a top view of a body of the execution component provided in an embodiment of the present disclosure.
Figure 11:
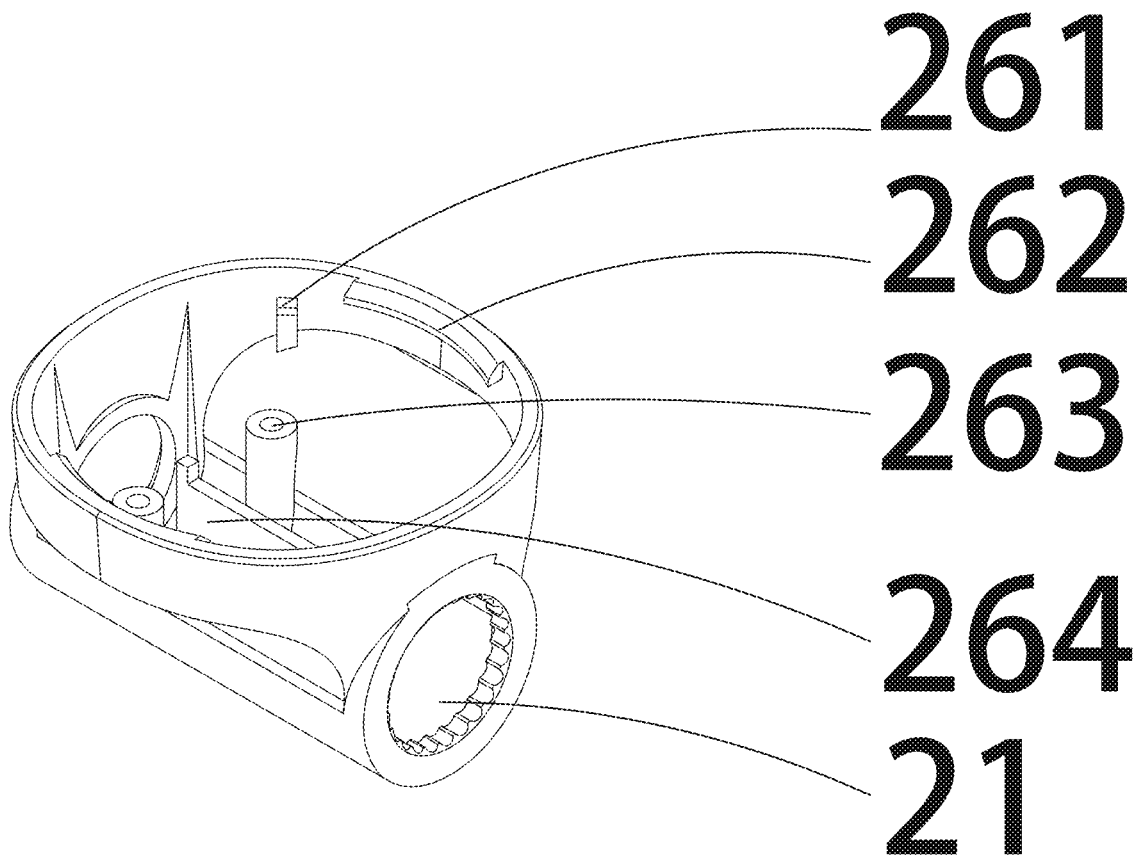
FIG. 11 is a structural schematic diagram of an upper cover of the execution component provided in an embodiment of the present disclosure.

Please refer to FIGS. 4 and 5. The control component 10 includes: the fix hole 11 for connecting the control component, a light switch key 12, an electric brush switch key 13, a solar panel 14, a waterproof silicone block 15, a touch display screen 16, a top charge port 17, a sound hole 18, a wiring hole 19, a charge port inside the silicone block (not shown), a voice control module (not shown), and a power supply (not shown).

The light switch key 12, electric brush switch key 13, solar panel 14, touch display screen 16, top charge port 17, charge port inside the silicone block (not shown), voice control module (not shown), and power supply (not shown) are all electrical connected. The touch display screen 16 displays a current statue of the electric brush head and controls a work statue of the electric brush head. The power supply (not shown) supplies power for the electric brush head device, and the solar panel 14 charges the power supply (not shown). The voice control module (not shown) is provided inside the control component 10 corresponding to the sound hole 18, facilitating a reception of sound incoming from the sound hole 18 and controlling the work statue of the electric brush head based on the sound. The charge port inside the silicone block (not shown) is a commonly used charge port, such as a type C interface and/or a USB interface, etc., used to connect to an external power source for charging.

Please refer to FIGS. 6 to 11. The execution component 20 includes the fix hole 21 for connecting the execution component, an electric motor 22, a fix connection element 23, a lower cover of the execution component 24, a body of the execution component 25, an upper cover of the execution component 26, and a self-rotation limit mechanism 27. The fix hole 21 for connecting the execution component is located on the upper cover of the execution component 26. The lower cover of the execution component 24 is fixed with the electric motor 22. The lower cover of the execution component 24 is fixed below the body of the execution component 25 through a screw, thereby the electric motor 22 being inside the body of the execution component 25. An output shaft of the electric motor 22 is connected to the fix connection element 23, thereby driving the fix connection element 23 to rotate. The fix connection element 23 includes a bayonet 231, a positioning bulge 232, and a first magnet 233. The positioning bulge 232 is used for positioning, the first magnet 233 is used to adsorb the work brush head 40, and the bayonet 231 is used to connect the work brush head 40. Different work brush heads 40 can be replaced on the fix connection element 23 as needed. The body of the execution component 25 includes a light 251, a rotation prompt portion 252, a self-rotation latch 253, a self-rotation block 254, and a self-rotation slide grove 255. The light 251 is used to provide a light source during an operation and illuminate a position that needs to be processed, thereby achieving a better processing result. The rotation prompt portion 252 is used to prompt a user a rotation direction. The upper cover of the execution component 26 includes a self-rotation fix block 261, a self-rotation slide rail 262, a fix threaded hole 263 of the fix bracket, and an accommodation slot 264 of the self-rotation limit clamp block. The electric motor 22 and the light 251 are electrically connected to the control component 10, and a connection wire can pass through the wiring hole 19. Thus, the light switch key 12 and the electric brush switch key 13 respectively control the work statue of the light 251 and the electric motor 22. And a touch of the display screen 16 and the voice control module (not shown) can also control the work statue of the light 251 and the electric motor 22.

The self-rotation limit mechanism 27 includes a self-rotation limit button 271, a fix bracket 272 of the self-rotation limit mechanism, a spring 273, and a self-rotation limit clamp block 274. The fix bracket 272 is fixed to the fix threaded hole 263 through a screw, and the self-rotation limit clamp block 274 is placed by the fix bracket 272 and the accommodation slot 264 together, facilitating a movement of the self-rotation limit clamp block 274. A spring 273 is included between the self-rotation limit clamp block 274 and the fix bracket 272 to assist a reset the self-rotation limit clamp block 274. The fix component 30 includes a hole 35 on the same side with the self-rotation limit button 271 to facilitate the self-rotation limit button 271 to pass through, so that the self-rotation limit button 271 comes into contact with the self-rotation limit clamp block 274 and is fixed on the fix component 30 on the same side with the self-rotation limit clamp block 274, so that an entire self-rotation limit mechanism 27 is fixed in the upper cover of the execution component 26. The upper cover of the execution component 26 is provided on the body of the execution component 25, the self-rotation slide rail 262 is located in the self-rotation slide groove 255, the self-rotation fix block 261 and the self-rotation block 254 are located on the same horizontal plane, and the latch on the self-rotation limit clamp block 274 meshes with the self-rotation latch 253, thereby limiting a rotation of the body of the execution component 25 by the self-rotation limit mechanism 27.

An entire rotation process is as follows: the upper cover of the execution component 26 and the self-rotation limit mechanism 27 fixed on the upper cover of the execution component 26 remain stationary, while the body of execution component 25 and the components fixed on the body of the execution component 25 rotate. During the rotation process, the self-rotation slide rail 262 does not move, the self-rotation slide groove 255 rotates, the self-rotation fix block 261 does not move, and the self-rotation block 254 rotates. When the self-rotation block 254 rotates to contact the self-rotation fix block 261, it cannot continue to rotate in the same direction; and thus, the self-rotation fix block 261 and the self-rotation block 254 cooperate to limit a rotation angle of the body of the execution component 25.

An entire operation process of self-rotation is as follows: pressing the self-rotation limit button 271, pushing the self-rotation limit clamp block 274 to move, and the spring 273 is compressed, the latch of the self-rotation limit clamp block 274 are disengaged from the self-rotation latch 253, and the body of the execution component 25 is rotated until it reaches a suitable angle, releasing the self-rotation limit button 271, and the self-rotation limit clamp block 274 will continue to engage with the self-rotation latch 253 under a reset effect of the spring 273, and thus, the body of the execution component 25 is fixed.

Figure 12:
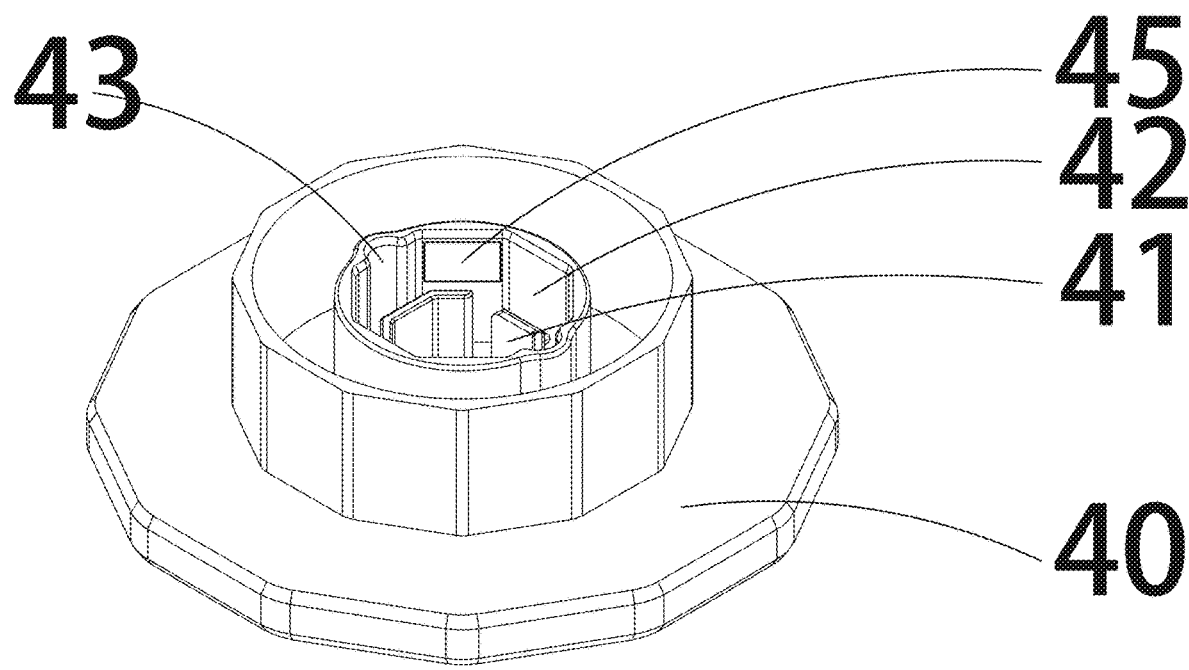
FIG. 12 is a structural schematic diagram of a work brush head provided in an embodiment of the present disclosure.
Figure 13:
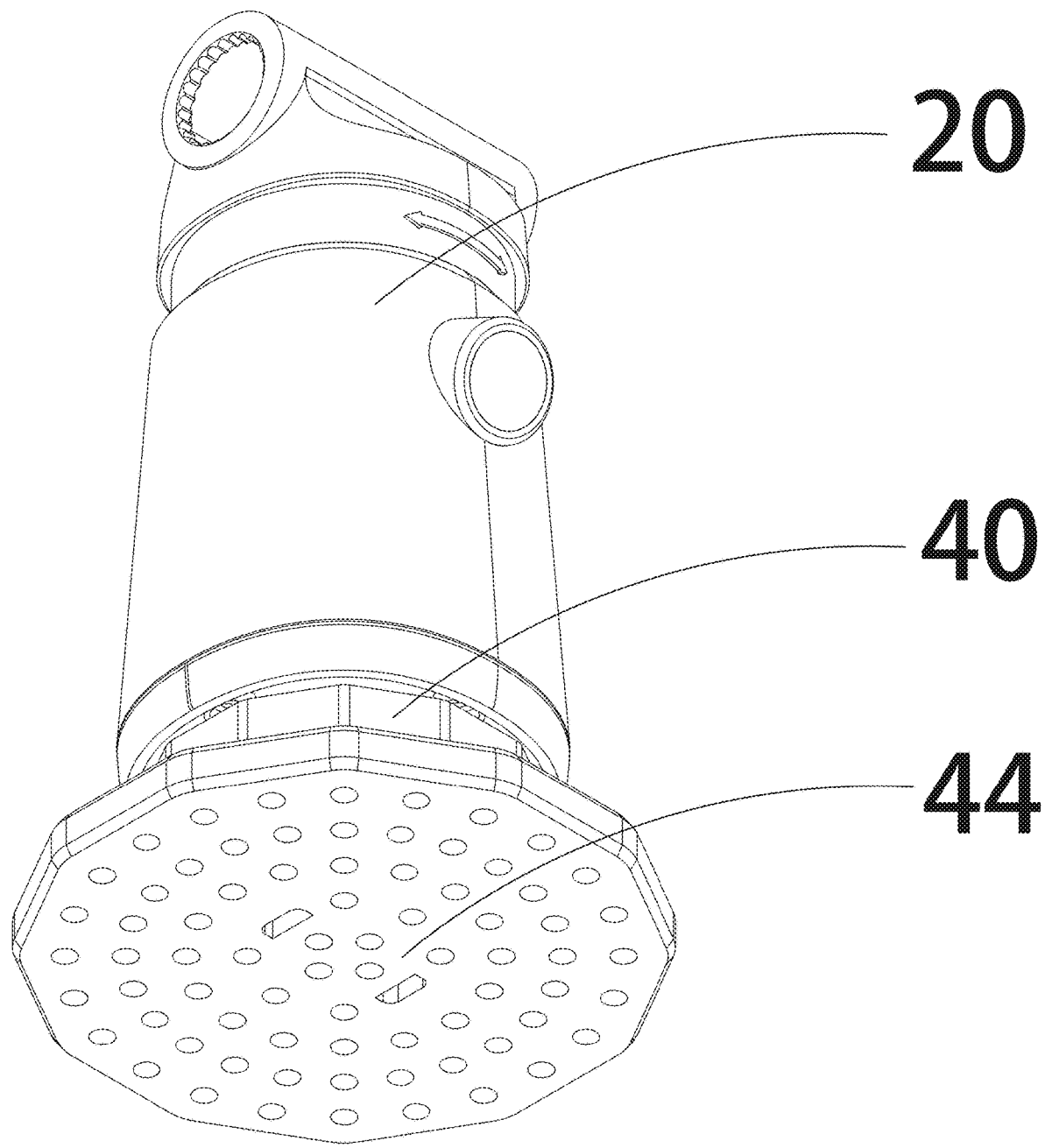
FIG. 13 is a schematic diagram of the execution component being in clamp-connection with the work brush head provided in an embodiment of the present disclosure.

Please refer to FIGS. 12 and 13. The electric brush head includes a work brush head 40, which includes a clamp block 41, a cavity 42, a concave edge 43, and a second magnet 45. The clamp block 41 is clamp-connection with the bayonet 231, and the cavity 42 is used to accommodate the fix connection element 23. An internal shape of the cavity 42 corresponds to the fix connection element 23, and the concave edge 43 is located on the cavity 42, and a shape of the cavity 42 corresponds to a shape of the positioning bulge 232, facilitating a positioning of the fix connection element 23 in the cavity 42, the second magnet 45 is attracted to the first magnet 233 on the fix connection element 23, thereby facilitating a fixation and disassembly of the work brush head 40 and the fix connection element 23. A bottom surface 44 of the brush head 40 of this type of work brush head is connected and fixed with a Velcro (not shown), and a tool is connected with the Velcro (not shown) to perform a work task.

Figure 14:
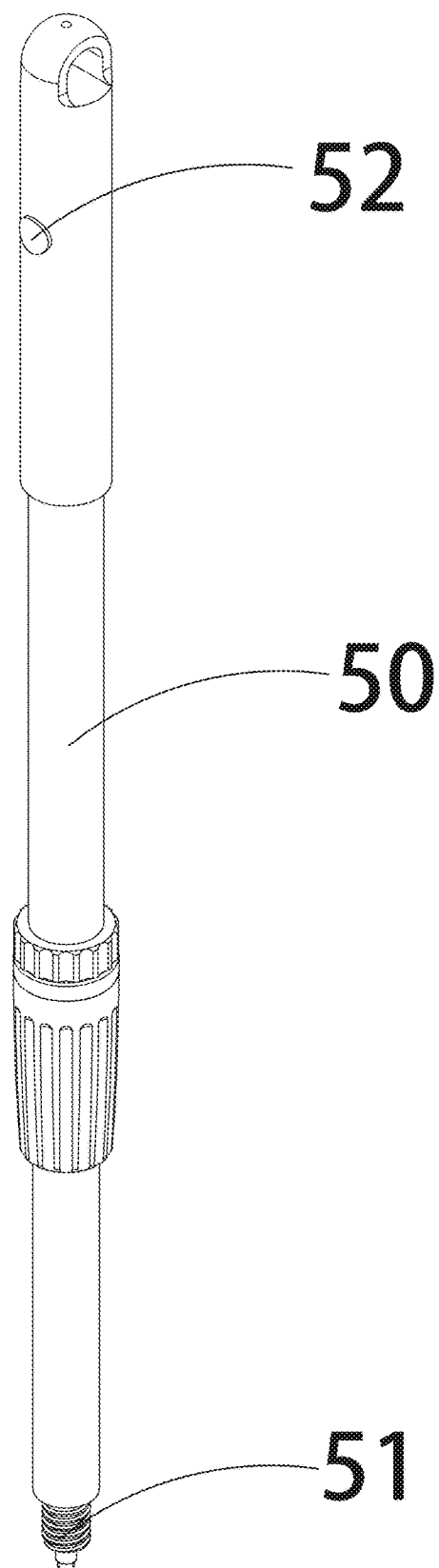
FIG. 14 is a structural schematic diagram of a telescopic rod provided in an embodiment of the present disclosure.
Figure 15:
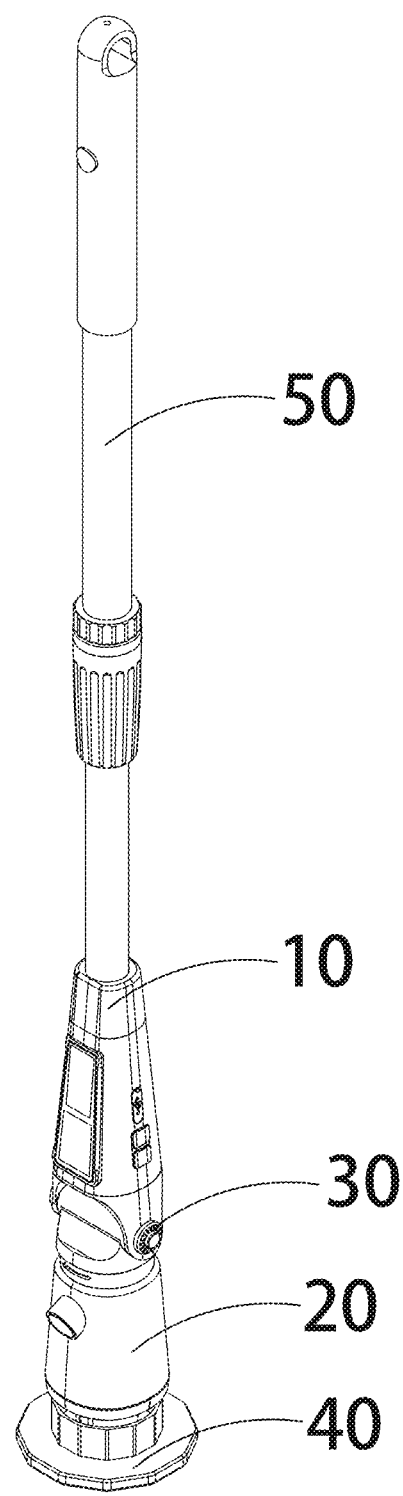
FIG. 15 is a schematic diagram of the telescopic rod being in connection to the electric brush head provided in an embodiment of the present disclosure.

Please refer to FIGS. 14 and 15, the electric brush head includes a telescopic rod 50. The telescopic rod 50 itself can be retracted and adjusted, and it includes a threaded plug 51 and a button 52. The threaded plug 51 and button 52 are electrically connected, and the threaded plug 51 is electrically connected with the top charge port 17 of the control component 10, so that the telescopic rod 50 is fixedly connected to the control component 10, and the button 52 can control a work statue of the electric brush head.

Figure 16:
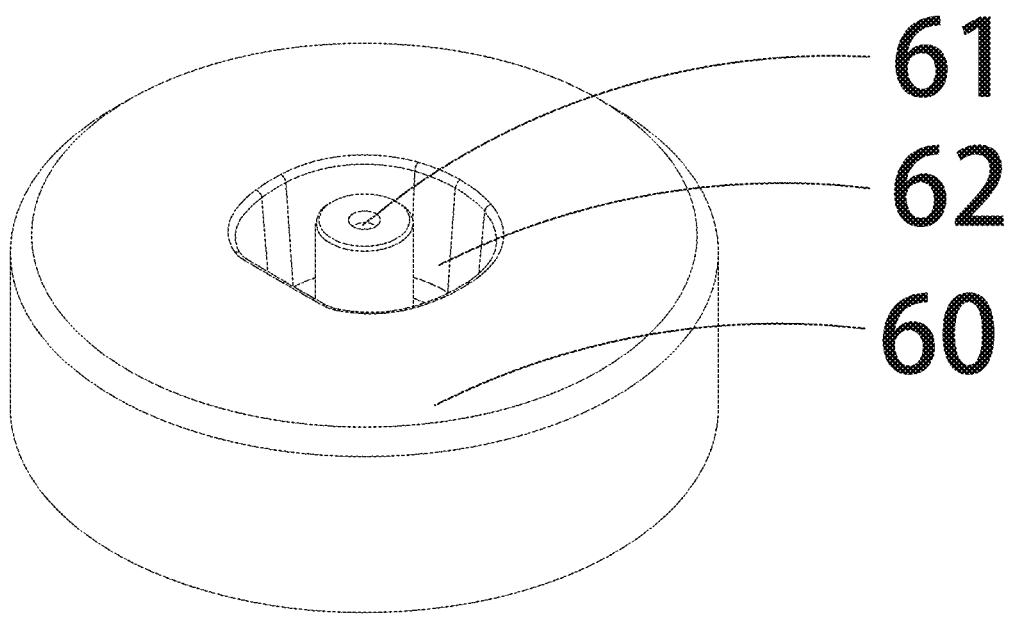
FIG. 16 is a structural schematic diagram of a charge base provided in an embodiment of the present disclosure.
Figure 17:
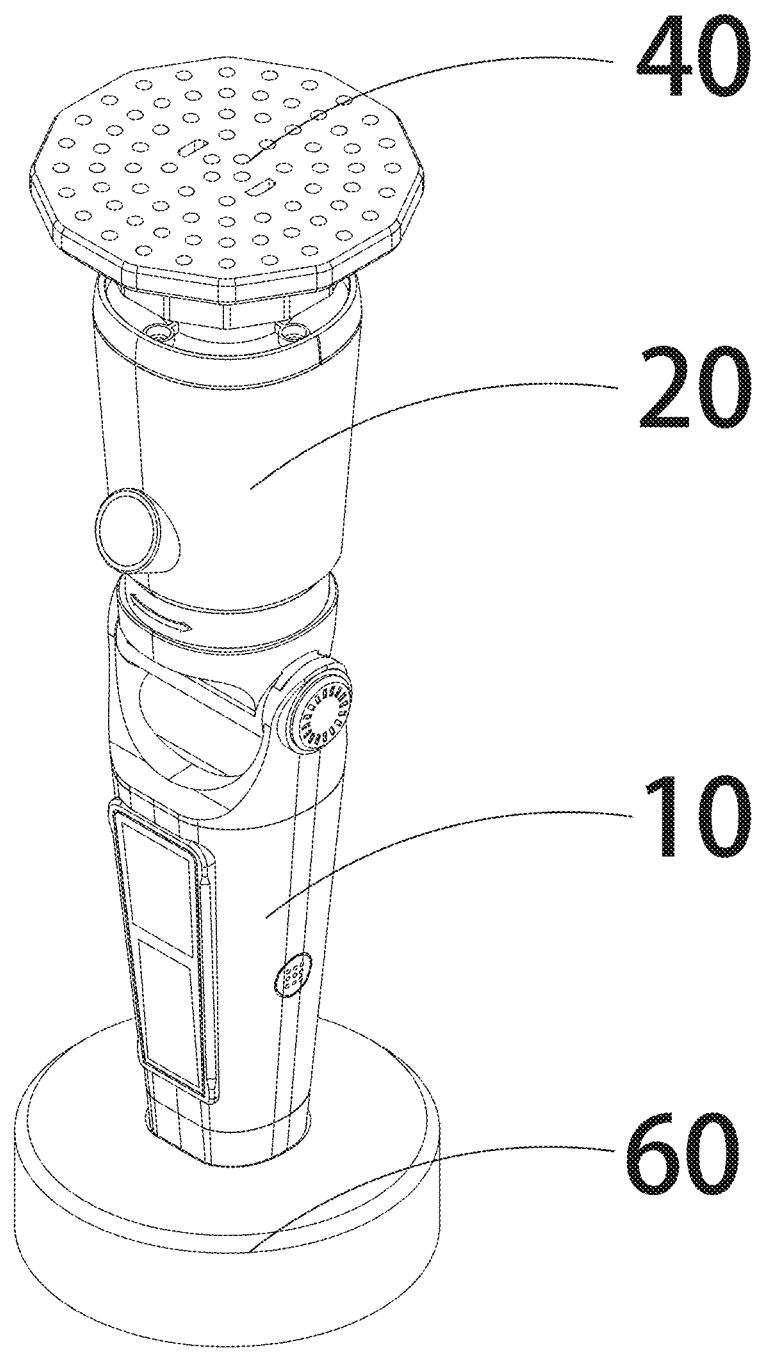
FIG. 17 is a schematic diagram of the charge base that charges for the electric brush head provided in an embodiment of the present disclosure.

Please refer to FIGS. 16 and 17, the electric brush head includes a charge base 60. The charge base 60 is connected to an external power source and can supply power to the entire electric brush head device through a paired plug. It is provided with a charge port 61 and a groove 62. The top charge port 17 of the control component 10 is paired and inserted into the groove 62, and the charge port 61 is used to charge the electric brush head.

Figure 18:
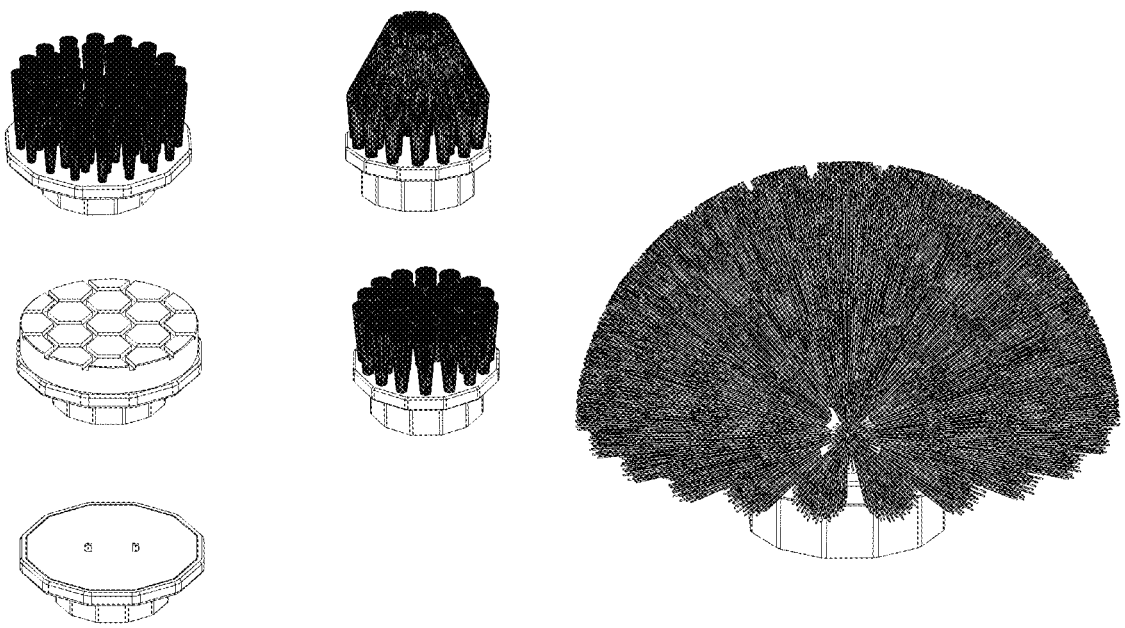
FIG. 18 is a schematic diagram of various work brush heads provided in an embodiment of the present disclosure.
Figure 19:
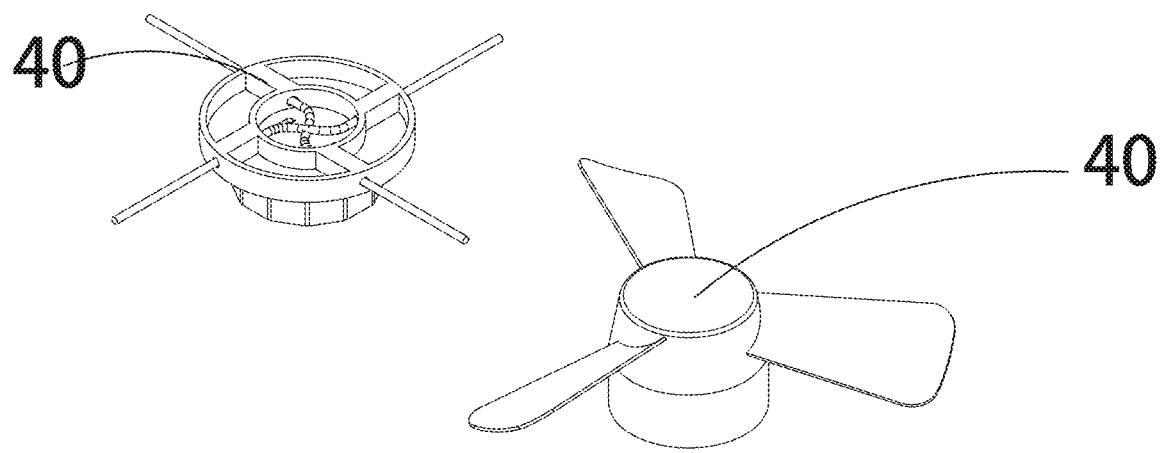
FIG. 19 is a schematic diagram of the brush heads belonging to different fields provided in an embodiment of the present disclosure.

Please refer to FIGS. 18 and 19. The electric brush head can be replaced with different work brush heads 40 according to needs, and even with different work brush heads 40 in different fields. For example, the work brush head 40 at the left side of FIG. 19 is a weeding work brush head, that can be used for weeding work; and the work brush head 40 at the right side of FIG. 19 is a blade work brush head, that can be used for heat dissipation.

In an embodiment of the present disclosure, the electric brush head can be installed and disassembled with the telescopic rod 50 as needed, and the telescopic rod 50 can control the work state of the electric brush head. After disassembling the telescopic rod 50, the electric brush head can be held in hand for cleaning work to cope with cleaning a dead angle of the electric brush head after installing the telescopic rod. By a relative rotation of the control component 10 and the execution component 20, and a self-rotation of the execution component 20, a large clean range can be obtained. A user can also replace different work brush heads 40 as needed to achieve a better clean result, or even replace the work brush heads in different fields for working in different fields, and expand the present disclosure range of electric brush heads. The electric brush head can choose a suitable charge mode according to needs, either by connecting the TYPE-C and/or USB charging cable externally to the charge port inside the silicone block on the control component 10 (not shown), or by using the charge base 60 as the charge mode. These two charge modes can be selected according to different environments.

The above are only some embodiments of the present disclosure and are not intended to limit the protection scope of the present disclosure. For those skilled in the art, this disclosure may undergo various modifications and changes. Any modifications, improvements, or equivalent replacements made within the spirit and principles of the present disclosure shall be included within the protection scope of the present disclosure. It should be noted that similar reference number represent similar feature or element in the following drawings, so once a feature or element is defined in one drawing, further definition and explanation are not required in subsequent drawings.

What is claimed is:

1. An electric brush head, comprising a control component, an execution component, a fix component, and a work brush head; the control component is rotatably connected to the execution component by the fix component; the control component is electrically connected to the execution component; the execution component is connected to the work brush head;

wherein, the control component comprise: a connecting hole of the control component, a light switch key, an electric brush switch key, a solar panel, a waterproof silicone block, a touch display screen, a top charge port, a sound hole, a wiring hole, a voice control module, and a power supply; the light switch key, electric brush switch key, solar panel, touch display screen, top charge port, voice control module, and power supply are all electrically connected;

the fix component is elastic; the fix component comprises a hook, a notch, a rectangular protrusion, and a circular protrusion; the hook is on a bottom surface of the fix component; and the notch, rectangular protrusion, and circular protrusion are on a side surface of the fix component;

the execution component comprises a connecting hole of the execution component, an electric motor, a fix connection element, a lower cover of the execution component, a body of the execution component, an upper cover of the execution component, and a self-rotation limit mechanism; the connecting hole of the execution component is located on the upper cover of the execution component; the upper cover of the execution component is fixed on the body of the execution component; the lower cover of the execution component is fixed below the body of the execution component; the electric motor is inside the body of the execution component and fixed above the lower cover of the execution component; an output shaft of the electric motor is connected to the fix connection element.

2. The electric brush head according to claim 1, wherein the fix connection element comprises a bayonet and a positioning bulge; the work brush head is provided with a clamp block, a cavity, and a concave edge; the clamp block is clamp-connection with the bayonet, the cavity accommodates the fix connection element, and the concave edge corresponds to the positioning bulge; and the work brush head is connected to the fix connection element.

3. The electric brush head according to claim 2, wherein the fix connection element further comprises at least one first magnet; and a corresponding position of the work brush head comprises at least one second magnet; the first magnet is attracted to the second magnet.

4. The electric brush head according to claim 1, wherein the body of the execution component comprises a light, a rotation prompt portion, a self-rotation latch, a self-rotation block, and a self-rotation slide groove; the self-rotation limit mechanism is matched with the self-rotation latch; the upper cover of the execution component is matched with the self-rotation block and fit with the self-rotation slide groove.

5. The electric brush head according to claim 4, wherein the self-rotation limit mechanism comprises a self-rotation limit button, a fix bracket of the self-rotation limit mechanism, a spring, and a self-rotation limit clamp block; the fix component comprises a hole on the same side with the self-rotation limit button; the self-rotation limit mechanism is fixed inside the upper cover of the execution component.

6. The electric brush head according to claim 5, wherein the upper cover of the execution component comprises a self-rotation fix block, a self-rotation slide rail, and a fix threaded hole of the fix bracket, and an accommodation slot of the self-rotation limit clamp block.

7. The electric brush head according to claim 6, wherein the fix bracket of the self-rotation limit mechanism is fixed on the fix threaded hole of the fix bracket; the self-rotation limit clamp block is placed by the fix bracket of the self-rotation limit mechanism and the accommodation slot of the self-rotation limit clamp block together; the spring is located between the self-rotation limit clamp block and the fix bracket of the self-rotation limit mechanism; the self-rotation slide rail is located inside the self-rotation slide groove, the self-rotation fix block and the self-rotation block are located on the same horizontal plane, and the self-rotation limit clamp block is engaged with the self-rotation latch.

8. The electric brush head according to claim 1, wherein the electric brush head comprises a telescopic rod; the telescopic rod comprises a threaded plug and a button; the threaded plug is electrically connected to the button; the telescopic rod is electrically connected to the control component.

9. The electric brush head according to claim 1, wherein the electric brush head comprises a charge base; the charge base comprises a charge port and a groove.

* * * * *